United States Patent [19]
Gross et al.

[11] Patent Number: 6,110,268
[45] Date of Patent: Aug. 29, 2000

[54] SINTERED BRAKE LINING AND METHOD FOR ITS MANUFACTURE

[75] Inventors: Gerhard Gross, Böbingen; Tilmann Haug, Uhldingen-Mühlhofen, both of Germany

[73] Assignee: Daimler-Benz Aktiengesellschaft, Stuttgart, Germany

[21] Appl. No.: 09/153,773

[22] Filed: Sep. 15, 1998

[51] Int. Cl.⁷ .................................................... C09K 3/14
[52] U.S. Cl. ........................... 106/36; 264/109; 264/122; 523/149; 523/152; 523/153; 523/155; 523/157
[58] Field of Search ............................... 106/36; 523/149, 523/152, 153, 155, 157; 264/109, 122

[56] References Cited

U.S. PATENT DOCUMENTS

| | | | |
|---|---|---|---|
| 3,494,774 | 2/1970 | Bray | 106/36 |
| 3,731,776 | 5/1973 | Fisher | 192/107 M |
| 5,024,899 | 6/1991 | Lang | 428/550 |
| 5,428,081 | 6/1995 | Song | 523/155 |

FOREIGN PATENT DOCUMENTS

| | | |
|---|---|---|
| 0 144 464 | 6/1985 | European Pat. Off. . |
| 1 123 835 | 2/1962 | Germany . |
| 2113036 | 10/1971 | Germany . |
| 313 7273 | 4/1983 | Germany . |
| 228 876 | 10/1985 | Germany . |
| 41 11 207 | 4/1992 | Germany . |
| 43 35 499 | 4/1994 | Germany . |
| 43 06 721 | 9/1994 | Germany . |

OTHER PUBLICATIONS

Schatt, Werner, Powder Metallurgy, Sintered and Composite Materials, 3rd edition, 1988, Dr. Alfred Hüthig Publishers, Heidelberg, ISBN 3–7785–1624–8, pp. 199, 345 to 364. (no month).

*Primary Examiner*—Anthony Green
*Attorney, Agent, or Firm*—Kenyon & Kenyon

[57] ABSTRACT

A friction-type member, which is suited, in particular, as a brake pad for a brake member of fiber-reinforced ceramic, and a method for manufacturing such a brake pad. A mixture is initially prepared from at least carbon particles and metal particles, if indicated, with the addition of polymer binding agents suited for pyrolysis; of hard material particles, such as silicon carbide or titanium carbide as abradants; and of solid lubricants, such as molybdenum sulphide or graphite, and subsequently cold-pressed into green compacts. Sintering is then carried out under vacuum or protective atmosphere, the organic binding agent concentrations initially being pyrolized, and the metal particles being at least partially bonded by reaction to carbon. The friction pads manufactured in this manner exhibit considerable mechanical strength, good frictional properties, as well as a high thermal loading capacity accompanied by a low rate of wear.

17 Claims, 2 Drawing Sheets

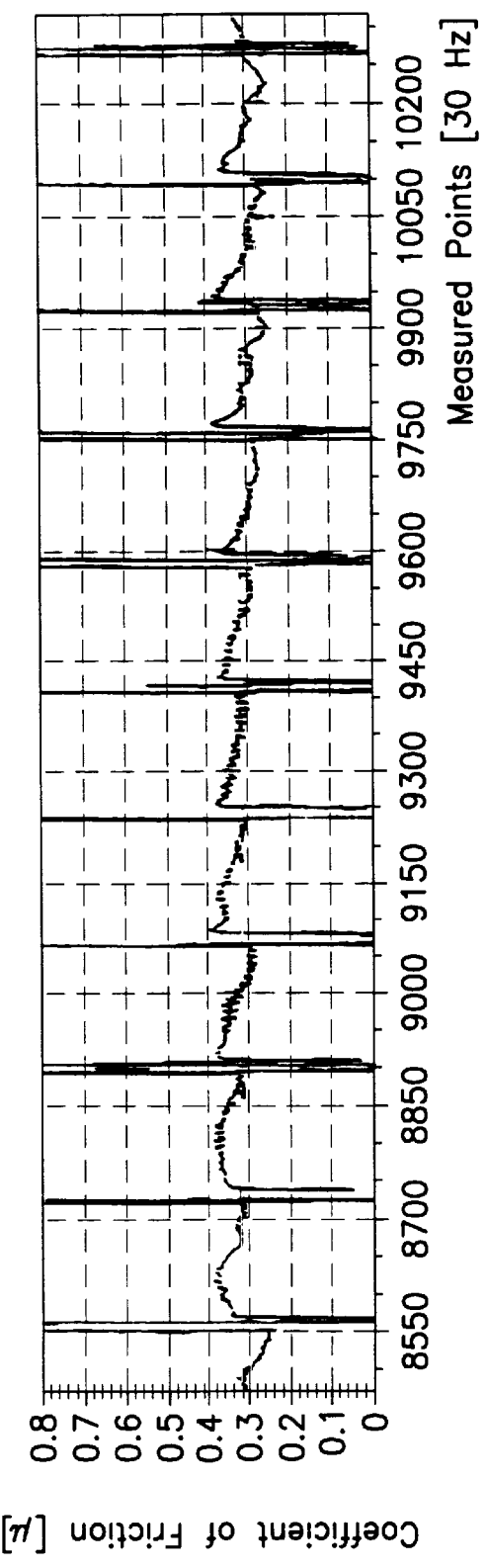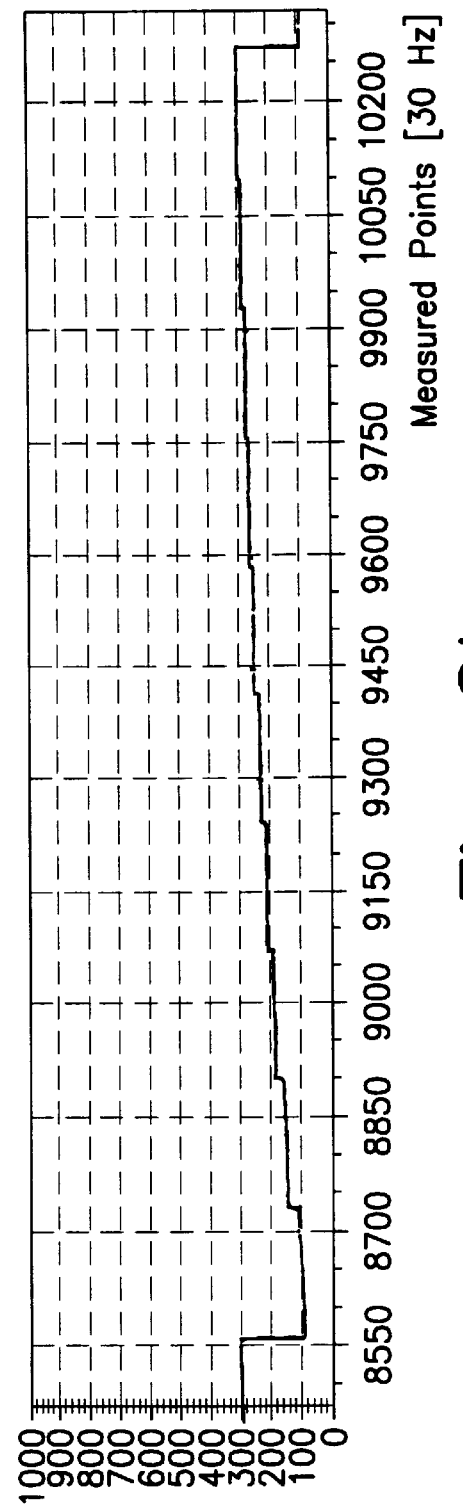

_US 6,110,268_

SINTERED BRAKE LINING AND METHOD FOR ITS MANUFACTURE

FIELD OF INVENTION present invention relates to a sintered brake pad which cooperates tribologically with a brake member of fiber-reinforced ceramic, as well as to a method for manufacturing such a brake pad.

RELATED TECHNOLOGY

Brake pads having an organically bonded matrix have been known for decades in automobile construction in connection with disc brake systems. For the most part, they are used together with brake discs having a gray cast iron base. More recently, inorganically bonded friction pads having a powdered metal base have also been used, in particular for disc brake systems operated under high stress, such as as those used in rail vehicles. These friction pads are made of a steel support plate, upon which columnar friction elements are placed, in some instances using resilient elements. The friction elements can be provided with a metallic partial encasing, with at least the outer frictional surface remaining uncovered.

The frictional mass is often composed of iron, to which one can add copper and, in some instances, its alloying elements, such as tin or zinc. Moreover, the frictional mass can contain solid lubricants, such as graphite, molybdenum, disulphide or lead, as well as hard materials as abradants, such as chromium carbide, ferrochromium and titanium carbide, or ceramic particles of metal oxides, such as $SiO_2$. These frictional masses are cold-pressed into green compacts, which are generally sintered under pressure into frictional elements. Carrying out the sintering process as a pressureless process and then, in some instances, further compressing the elements has also been proposed.

In addition, it is also known from the German Patent Application No. 43 06 721 A1 to manufacture unsintered friction pads by securing columnar friction elements made of inorganically bonded frictional material having a powdered metal base to a steel support plate, the frictional mass including 30 to 50% by volume of iron, 5 to 45% by volume of carbon, 20 to 45% by volume of copper and/or copper compounds, 0 to 10% by volume of hard material particles, and 0 to 10% by volume of solid lubricants, which are coldpressed in a mold into frictional elements, and after being heated to a temperature less than the sintering temperature, are joined to the carrier plate, the surface area of the frictional elements being coated with copper or a copper alloy.

Friction pads of this kind have been specially developed for use with metallic brake members, in particular brake discs mostly made of gray cast iron or steel. Good frictional pairing and a continuous braking performance is ensured in connection with metallic brake members of this kind.

Moreover, the thermal loading capacity is limited by the thermal stability of the metallic copper sheathing, particularly when it comes to the brake pad according to German Patent Application No. 43 06 721 A1.

From Schatt, Werner, "Pulvermetallurgie, Sinter- und Verbundwerkstoffe" [Powder Metallurgy, Sintered and Composite Materials], 3rd edition, 1988, Dr. Alfred Huithig Publishers, Heidelberg, ISBN 3-7785-1624-8, pp. 199, 345 to 364, it is known to manufacture sintered frictional materials and sintered brake pads. It describes preparing a mixture of carbon particles and metal particles and, if indicated, of other additives, of pressing the mixture in a mold, and subsequently sintering it. In this case, the carbon can be added in powdery form, for instance from graphite. During the sintering process, the reactions to be expected following the iron-carbon constitutional diagram occur, so that a bonding by reaction with carbon occurs.

Moreover, from European Patent Application No. 0 144 464 A1, a brake pad has become known, for which sinterable metal particles, carbon-containing material and curable polymer resin are mixed, the mixture is poured into a mold, and the resin is cured to bring the mixture into a preformed state. Heat is then applied to carbonize the resin and to sinter the metal particles to a sintered matal matrix. In the process, hard material particles can also be added.

Common to the aforementioned brake pads is a design conceived for a frictional pairing of conventional gray cast iron discs or steel discs.

CVC brake discs have been used for high-performance brake systems, but so far have gained acceptance only for use in automobile racing, due to their high price and high rate of wear. More recent developments are directed to carbon fiber-reinforced silicon carbides, such as C/SiC, or to silicon carbide fiber-reinforced silicon carbides, such as SiC/SiC. By reinforcing the ceramic with high-tensile fibers, such as carbon fibers, one obtains a ceramic that is not susceptible to damage and that breaks in a quasi-ductile manner. Materials of this kind are especially resistant to abrasion and have an extremely high thermal loading capacity.

For brake members of this kind made of fiber-reinforced ceramic, until now no suitable frictional member has been developed, which stands up to the rigorous requirements of this kind of frictional pairing of high thermal loading capacity and minimal wear while maintaining a high enough coefficient of friction. Conventional brake pads, in particular those featuring organic bonding of particles of different materials to form a composite, exhibit poor frictional performance characteristics when frictionally paired with ceramic brake bodies, show a high rate of wear, and also are not sufficiently temperature-resistant for such an application.

SUMMARY OF THE INVENTION

Therefore, an object of the present invention is to provide a brake pad, which will cooperate tribologically with a brake member of fiber-reinforced ceramic, and which demonstrates considerable strength, good frictional properties, as well as a high thermal loading capacity accompanied by a low rate of wear, and to provide a method for manufacturing such a brake pad.

The present invention provides a sintered brake pad, which contains carbon and metal particles that have at least partially bonded by reaction to the carbon, and additionally hard material particles, as well as pyrolyzed polymers as binding agents, these being derived from polysiloxanes, polycarbosilanes and/or carbon resins.

The present invention also provides a method for manufacturing a brake pad which cooperates tribologically with a brake member of fiber-reinforced ceramic, and for which a mixture of carbon particles, metal particles, hard material particles and pyrolyzable polymers, containing polysiloxane and/or polycarbosilane as a binding agent, is pressed into a mold and sintered under vacuum or protective gas until the metal particles are at least partially bonded by reaction to carbon.

In accordance with the present invention a bonding by reaction of the metal particles intercalated in the matrix through a carbidization at least at the surface achieves desired properties of the frictional member. The intercalated metal particles are bonded securely enough to the matrix, preventing metal particles from being pulled out of the matrix and, thus, avoiding additional abrasive wear. At the same time, the at least partial carbidization of the metal particles on the surface substantially enhances the brake pad's temperature resistance and resistance to wear. The carbon constituent, in conjunction with the partially carbidized, intercalated metal particles, result in a clearly improved frictional pairing in uses with brake members of fiber-reinforced ceramic.

In accordance with the present invention frictional members of this kind are able to be produced by sintering a compression-molded mixture of at least carbon particles and metal particles under a vacuum or protective atmosphere, the sintering parameters being selected so as to ensure that the metal particles are at least partially bonded by reaction to carbon during the sintering process.

According to the present invention, polymers suited for pyrolysis, preferably at least pitch, polysiloxane or polycarbosilane, are added as binding agents to the mixture.

By adding organic binding agents in this manner, green compacts of sufficient strength are able to be produced when cold-pressing the mixture. Since the organic binding constituents pyrolyze to secondary carbon, SiOC and/or SiC during the subsequent sintering process, the matrix composite is improved as a result, and the bonding by reaction of the intercalated metal particles is reinforced, since the pyrolytically formed carbon is considerably more reactive than the primary intercalated carbon.

In an advantageous embodiment of the present invention, the carbon particles are added in powdery form, coke powder and, optionally, graphite powder being preferred.

In an additional embodiment of the present invention, the metal particles are used in powdery form, iron, steel, gray cast iron, bronze, brass, silicon, ferrosilicon and/or copper being preferred.

Depending on the brake member used as a friction partner, different metals of the ones mentioned, or also combinations thereof are preferred in suitable mixing ratios.

In a further embodiment of the present invention, hard material particles, preferably in powdery form, are added to the mixture, silicon carbide and/or titanium carbide being preferred in particular. Also suited, however, are boron carbide, aluminum oxide or glass.

By adding up to 20% by weight, preferably up to 10% by weight of hard material particles of this kind, the wear the frictional member is subject to is able to be reduced, i.e., the resistance to wear is able to be clearly enhanced.

According to another advantageous embodiment of the present invention, solid lubricants, preferably molybdenum sulphide and/or graphite are added to the mixture.

Through this measure, a constancy in the friction coefficients is supported over broad temperature ranges and, at the same time, the rate of wear is reduced. In this case, lubricant additives of up to 30% by weight, preferably up to 15% by weight have proven to be advantageous.

The mixture used is preferably composed of 20 to 70% by weight of carbon in primary or pyrolytically produced form, 10 to 60% by weight of metal particles, which are at least partially bonded by reaction to carbon, up to 20% by weight of hard material particles, and up to 20% by weight of solid lubricants.

For the cold-pressing operation, pressing pressures of about 500 to 2000 bar have proven to be advantageous for manufacturing green compacts of sufficient strength.

To the extent that binding agents, such as pitch, polysiloxane or polycarbosilane are added, the pressing pressure can be reduced, preferably to about 50 bar.

The subsequent sintering operation is preferably carried out within a temperature range of about 800 to 1400° C., a temperature from about 1000° C. to 1200° C. proving to be especially advantageous.

It is understood, of course, that the features of the present invention mentioned above and those still to be elucidated may be used not only in the combination indicated in each case, but also in other combinations, or singly, without departing from the scope of the present invention.

BRIEF DESCRIPTION OF THE DRAWINGS

The following description of preferred exemplary embodiments reveals features and advantages of the present invention, reference being made to the drawing, in which:

FIGS. 2a, 2b show results of a brake test using a brake pad having a surface area of 86×60 mm in accordance with FIG. 1, which was tested on a brake test stand using a brake disc of short-fiber reinforced ceramic (C/C-SiC) having a diameter of 280 mm, the profile of the coefficient of friction being shown in FIG. 2a, and the temperature of the brake disc in the disc center in FIG. 2b.

DETAILED DESCRIPTION

Figure 1:
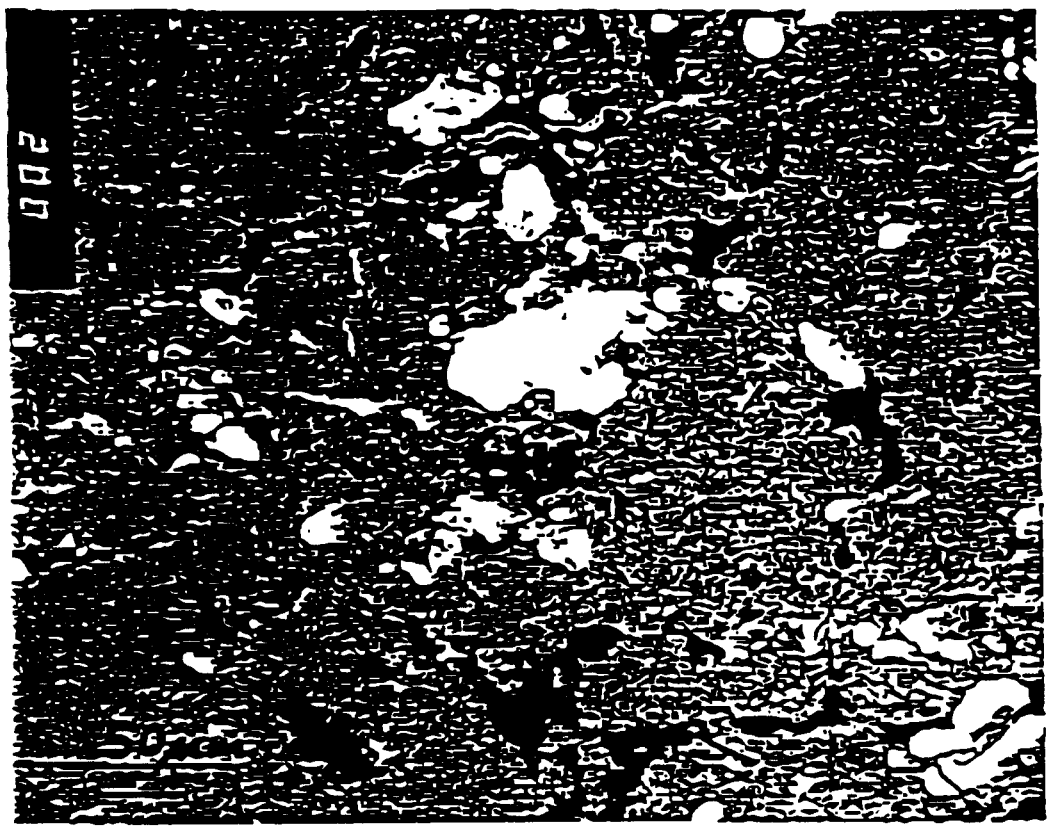
FIG. 1 shows a light-microscopic micrograph of a friction pad according to the present invention that was fabricated from 30% by weight of steel powder, 2% by weight of natural graphite, 5% by weight of pitch, and 63% by weight of coke.

To manufacture the frictional member of the present invention, a mixture of carbon powder (preferably coke); a polymer suited for pyrolysis (preferably pitch, polysiloxane, and polycarbosilane) as binding agents; powdered metal (preferably iron); hard- material powder as abradants (preferably TiC and/or SiC); and of solid lubricants (preferably $MoS_2$) are cold-pressed using a pressure of 500 to 2000 bar. The resuting green compacts are subsequently sintered at temperatures of 800 to 1200° C., preferably of about 1000° C., under protective gas, the organic binding agents initially being pyrolyzed. In the process, pitch is pyrolyzed to secondary carbon, with polysiloxane pyrolyzing to Si-O-C and polycarbosilane to SiC (C,O). During the sintering process, the metallic powders react completely or partially, depending on the sintering conditions and particle size, with the corresponding carbides.

Sintered members having a flexural strength of at least 30 MPa and a hardness of HV 800 to 1200 are obtained. These members are adapted in their hardness and strength to the brake member material, "short-fiber reinforced ceramic". The high carbon and ceramic content in the abradants and the carbidized powdered metals permits substantially higher temperatures than is the case when working with conventional brake pads. The high carbon content facilitates the embedding of the hard particles originating from the ambient environment or from the frictional partners, thus preventing them from causing any further abrasive wear.

EXAMPLE 1

A mixture of 30% by weight of steel powder, 2% by weight of natural graphite, 5% by weight of pitch, and 63% by weight of coke powder was cold-pressed at 1500 bar and subsequently sintered at 1000° C. under argon atmosphere.

FIG. 1 depicts the texture of the finished member in a light-microscopic micrograph. The light textural areas are steel particles intercalated in the carbon matrix, while the carbon matrix appears gray. The black textural areas show residual porosity, in part also pyrolitically formed secondary carbon.

Two brake pads having a surface area of 86×60 mm were roughed out mechanically from the members and tested on a brake test stand using a brake disc of short-fiber reinforced ceramic (C/C-SiC) having a diameter of 280 mm. The coefficient of friction was between 0.28 and 0.4 in accordance with FIG. 2a. In response to a brake pressure of 20 bar, the rate of wear was measured at 0.7 g.

EXAMPLE 2

With respect to Example 1, the concentration of the steel powder was increased to 50% by weight. Apart from that, the same test conditions were used as in Example 1. The measured coefficient of friction was between 0.20 and 0.45. The rate of wear in response to a contact pressure of 20 bar was 1 g. Thus, the frictional performance characteristics correspond more or less to Example 1.

EXAMPLE 3

The steel powder concentration was reduced to 10% by weight. Apart from that, the same test conditions were used as in Example 1. At 0.15 to 0.28, the measured coefficient of friction was clearly lower; in response to a pressure of 20 bar, the measured rate of wear was 1.4 g and was, thus, twice as high as in Example 1.

EXAMPLE 4

A conventional C/C brake pad of the firm HITCO was tested analogously to the conditions of Example 1. At 0.2 to 0.25, the measured coefficient of friction was very low, and in response to 20 bar, the rate of wear at 7.7 g was very high. Thus, this conventional brake pad is too soft.

EXAMPLE 5

A brake pad from the brake disc material was tested under conditions analogous to those of Example 1. At 0.4 to 0.6, the coefficient of friction was high, and at 7.2 g, the measured rate of wear was very high. Evidently when a "hard pad" of this kind is used, the ability of hard particles to be embedded is no longer satisfactory. The result is, therefore, substantial abrasive wear.

EXAMPLE 6

A conventional organically bonded mass-produced pad was tested under conditions analogous to those of Example 1. At 0.15 to 0.35, the coefficient of friction was low and, at 30.4 g, the rate of wear was extremely high.

EXAMPLE 7

A conventional, gray cast iron DAIMLER-BENZ brake disc was tested with the original series pad according to Example 6 under test conditions analogous to those of Example 1. The rate of wear of the brake pads was determined to be 5.0 g and is, thus, more or less five times as great as that of Example 1 and 2.

The examples illustrate that the brake pad of the present invention showed resistance to wear that was clearly improved over conventional series-produced brake pads. It was also revealed that, in comparison with an organically bonded brake pad used in combination with a gray cast iron brake disc, the brake pad of the present invention used in combination with a brake disc of fiber-reinforced ceramic exhibits a superior coefficient of friction and wear properties that are improved several times over.

What is claimed is:

1. A sintered brake pad for cooperating tribologically with a brake member including fiber-reinforced ceramic, the brake pad comprising:

carbon particles;

metal particles bonded at least partially by reaction to the carbon of the carbon particles;

hard material particles suitable for use as abradants; and pyrolyzed polymers as binding agents, the pyrolyzed polymers being derived using a substance selected from the group consisting of polysiloxanes, polycarbosilanes and pitch.

2. The brake pad as recited in claim 1 wherein the metal particles include particles selected from the group consisting of iron, steel, gray cast iron, silicon, ferrosilicon, bronze, brass, and copper.

3. The brake pad as recited in claim 1 wherein the hard material particles include metal carbides of the metal particles.

4. The brake pad as recited in claim 1 wherein the hard material particles include particles selected from the group consisting of silicon carbide, titanium carbide, boron carbide, aluminum oxide and glass.

5. The brake pad as recited in claim 1 further comprising particles of at least one solid lubricant.

6. The brake pad as recited in claim 5 wherein the at least one solid lubricant includes a lubricant selected from the group consisting of molybdenum sulphide and graphite.

7. The brake pad as recited in claim 1 further comprising particles of at least one solid lubricant, and wherein:

the carbon particles include a primary or pyrolytically produced form of carbon and comprise 20 to 70% by weight of the brake pad;

the metal particles comprise 10 to 60% by weight of the brake pad;

the hard material particles comprise up to 20% by weight of the brake pad; and the solid lubricant particles comprise up to 20% by weight of the brake pad.

8. A method for manufacturing a brake pad which cooperates tribologically with a brake member including fiber-reinforced ceramic, the method comprising:

pressing into a mold a mixture including pyrolyzable polymers as binding agents, carbon particles, metal particles, and hard material particles suitable for use as abradants, the polymers containing a substance selected from the group consisting of polysiloxane, polycarbosilane and pitch; and sintering the mixture under vacuum or a protective gas until the metal particles are at least partially bonded by reaction to carbon of the carbon particles.

9. The method as recited in claim 8 wherein the carbon particles include a powdery form and include particles selected from the group consisting of coke and graphite.

10. The method as recited in claim 8 wherein the metal particles include particles selected from the group consisting of iron, steel, gray cast iron, silicon, ferrosilicon, bronze, brass, and copper in powder form.

11. The method as recited in claim 8 wherein the hard material particles include particles selected from the group consisting of silicon carbide, titanium carbide, boron carbide, aluminum oxide and glass.

12. The method as recited in claim 8 wherein the mixture further includes at least one solid lubricant in a powdery form.

13. The method as recited in claim 12 wherein the at least one solid lubricant includes a lubricant selected from the group consisting of molybdenum sulphide and graphite.

14. The method as recited in claim 8 wherein the mixture further includes at least one solid lubricant, the mixture comprising:

from 20 to 70% by weight of the carbon particles in a primary or pyrolytically produced form;

10 to 60% by weight of the metal particles;

up to 20% by weight of the hard material particles; and up to 20% by weight of the at least one solid lubricant.

15. The method as recited in claim 8 wherein the pressing step is performed as a cold-pressing at a pressing pressure of about 500 to 2000 bar.

16. The method as recited in claim 8 wherein the pressing step is performed at a pressing pressure of about 50 bar.

17. The method as recited in claim 8 wherein the sintering step is performed at a temperature of about 800 to 1200° C.

* * * * *